Sept. 30, 1969  R. S. WOOD  3,469,531
INTERMESHING GEARS, MORE PARTICULARLY IN GEAR PUMPS
Filed Nov. 30, 1967

United States Patent Office 3,469,531
Patented Sept. 30, 1969

3,469,531
INTERMESHING GEARS, MORE PARTICULARLY IN GEAR PUMPS
Robert S. Wood, Ilford, Essex, England, assignor to The Plessey Company Limited, Ilford, England, a British company
Filed Nov. 30, 1967, Ser. No. 686,885
Claims priority, application Great Britain, Dec. 7, 1966, 54,693/66
Int. Cl. F04c 1/08
U.S. Cl. 103—126         3 Claims

ABSTRACT OF THE DISCLOSURE

To even out wear of the pumping-gear flanks, tip relief is applied to the flank of the driver gear only, thus increasing, due to elastic deformation, the wear at the root portion of the driver gear and at the tip portion of the driven gear at the beginning of each engagement while reducing the wear near the tip of the driver gear and the root of the driven gear near the end of each tooth engagement.

---

In the operation of high-grade gear pumps wear of the gear flanks constitutes a serious problem limiting the life of the pump, and the present invention has for an object to provide improved pairs of intermeshing gears in which the effect of gear wear upon the life of the pump is reduced. According to the present invention this is achieved by relieving the gear flanks of the driving gear towards the tooth tips by an amount which, while small enough to ensure under normal torque loading sealing contact of the gear tips with the flanks of the driven gear up to a point along the engagement line sufficiently distant from the point of first engagement to ensure, due to the resilient deflection of the next following pair of teeth, adequate overlap of the engagement of consecutive pairs of teeth, is large enough to ensure transfer of an appreciable amount of the normal engagement pressure of a tooth nearing the end of the engagement line to the next-following tooth which is near the beginning of the line of engagement.

The invention is based on the recognition that, when the teeth of both gears have the theoretically correct convolute shape, the engagement presure increases from the point of first engagement towards the end of the line of engagement, and that therefore those parts of the tooth flanks of the two gears which are operative along the last portion of the engagement line, that is the portions near the tip of the teeth on the driving gear, and the portions near the root of the teeth of the driven gear, will wear more quickly than the remainder of the respective tooth profile, and that it is the wear on these portions of the profiles which eventually renders the gears unserviceable. If on the other hand the tooth profile is relieved according to the present invention at one or both the profile positions hitherto subject to maximum wear, preferably by relieving the teeth of the driving gear near their tip, use is made of the resilience of the gear teeth to decrease the wear of the portions in question of the tooth profile at the expense of these portions which hitherto were subject to minimum wear, so that wear is evened out and the time at which the gears become unserviceable due to wear is delayed.

Preferably the relief of the tip portion of the teeth of the driving gear is effected on both flanks. This makes it possible, when one flank of each tooth has been worn out, to reverse both gears, whereafter the pump is available for a second, substantially equal term of life in which the other flank is subjected to wear.

Figure 1:
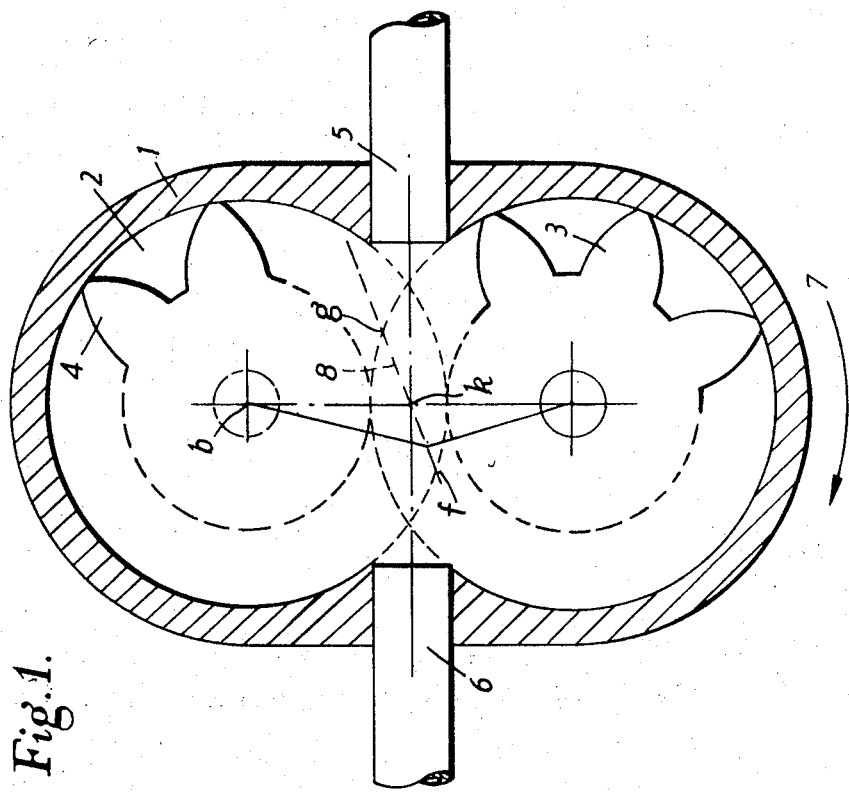
FIGURE 1 is a somewhat diagrammatic sectional elevation of a gear pump.

Referring now first to FIGURE 1, a gear pump housing 1 has a pumping chamber 2 in the form of two overlapping circular recesses for the respective accommodation of a driver gear 3 and a driven gear 4. An inlet port and passage 5 leads into the intermesh zone of the pumping chamber 2 at one side of the plane containing the axes of the two gears, and a delivery port and passage 6 is similarly arranged at the other side of this plane. When the driver gear 3 is driven in the direction of the arrow 7, the leading flanks of its teeth make, in turn, contact with the trailing flanks of the teeth of the driven gear 4 at a point $f$, on the tip circle of the driven gear 4 and from this point the point of contact between the two flanks will travel along a straight line 8 generally referred to as the line of engagement, which terminates at a point $g$ at which the line 8 intersects the tip circle of the driver gear 3. It can be shown by mathematical considerations that when gear 3 drives gear 4, the tooth load rises as the point of contact moves from $f$ to $g$, one reason being that the radial distance of point $g$ from the centre $b$ of the driven gear is shorter than that of point $f$ so that a greater force must be applied at point $g$ to transmit a given torque than at point $f$. The result is a cyclic fluctuation in the tooth load which, combined with the rate of sliding between the gear teeth, produces an uneven rate of wear; the velocity of sliding is at a maximum at the two ends of the line of engagement and is zero at the point $k$ at which the line of engagement intersects the plane containing the axes of the two gears. Pump tests have shown that in fact the main tooth-flank wear takes place at the tip of the driver gear and at the root of the driven gear.

Figure 2:
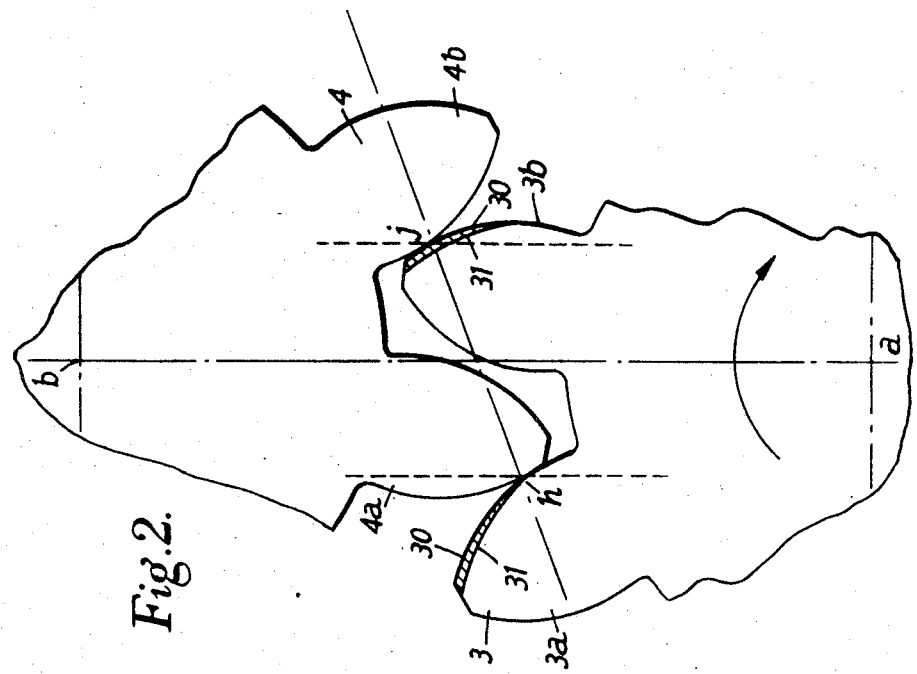
FIGURE 2 is an enlarged scrap view of the engaging portions of the two pumping gears diagrammatically illustrating the relief of the teeth of the driving gear proposed by the present invention.

FIGURE 2 illustrates the manner in which the teeth of the driver gear 3 are modified according to the present invention in order to counteract this tendency while leaving the theoretical toothed profile, indicated by the line $3b$ of the driver gear, unaffected up to a point $h$ which makes initial engagement with the driven gear 4. The part of the tooth flank of the driver gear 3 extending towards the tooth tip from this point $h$ is progressively relieved as shown by line 31 so that, while the contact of a tooth $3a$ which has just made contact with the corresponding tooth $4a$ of the driven gear 4, remains unaltered, the preceding tooth $3a$ of the driven gear, which nears the end of the zone of engagement would, were it not for elastic deformation of the gears due to the torque load, be clear of the (unaltered) flank of the corresponding tooth $4b$ of the driven gear 4. Owing, however, to the elasticity of the gear teeth, the transmission of torque from the driver gear 3 to the driven gear 4 has the effect of restoring simultaneous contact of the two teeth, but with the tooth pressure of the flank of tooth $3b$ which nears the end of the engagement zone, greatly reduced at the expense of an increase of the tooth pressure on tooth $3a$ at point $h$ near the beginning of the engagement zone, the elastic deformation taking care of the maintenance of sealing contact between the teeth at point $j$ near the end of the engagement zone.

The invention thus results in increasing the wear of the tooth flanks of the driver gear near the root zone of the teeth and of those of the driven gear near the tips, and in decreasing the wear of the tooth flanks of the driver gear near its tips and the wear of the driven gear near the roots of the flanks, or in other words it tends to equalise the wear over the whole engagement zone of each tooth, thus ensuring minimum alteration of the tooth shape even after appreciable wear. It will also be noticed from FIGURE 2 that if tip relief were applied to both the driver gear and the driven gear, an arrangement which is well known in power-transmission gears, the improvement in uniformity of wear obtained by the invention would not be achieved, because the effect of the tip relief of the driven gear would be equal and opposite to that of the relief of the driver gear.

The features of the present invention, which equalise the wear along the flanks of the individual teeth of each gear, can be combined with the features described in our United States Patent No. 3,195,469, both as regards the use of relatively prime numbers of teeth in the two cooperating pumping gears and as regards the reversibility of the housing relative to the two pumping gears to substitute engagement of the hitherto trailing flank of the driver gear with the hitherto leading flank of the driven gear as the new leading and trailing flanks respectively, thus substantially doubling the already extended life of the gear pump.

What I claim is:

1. A gear pump having a driver gear and a driven gear arranged for intermeshing rotation in a pump housing, wherein, in at least one of the gears, a portion of the profile of each tooth which is normally operative in the terminal portion of each engagement cycle is, throughout the operative width of the tooth, relieved progressively from the point of first engagement towards the point of disengagement compared with the profile corresponding to a uniform speed ratio so as to move away from the cooperating profile after making initial contact therewith when operating in the absence of a torque load.

2. A gear pump as claimed in claim 1, wherein the engagement profile of the teeth of the driver gear is progressively relieved from a point near the root towards the tip of each tooth.

3. A gear pump as claimed in claim 2, wherein both flanks of each gear tooth of the driver gears are thus relieved.

References Cited

UNITED STATES PATENTS

| | | | |
|---|---|---|---|
| 1,701,222 | 2/1929 | Belati | 74—462 |
| 1,895,360 | 1/1933 | Wildhaber | 74—462 |
| 1,976,227 | 10/1934 | Howard | 103—126 |
| 2,601,003 | 6/1952 | Pontius | 103—126 |

DONLEY J. STOCKING, Primary Examiner

W. J. GOODLIN, Assistant Examiner